2 Sheets—Sheet 1.
J. J. BREACH.
Apparatus for Grading Patterns.
No. 219,615. Patented Sept. 16, 1879.
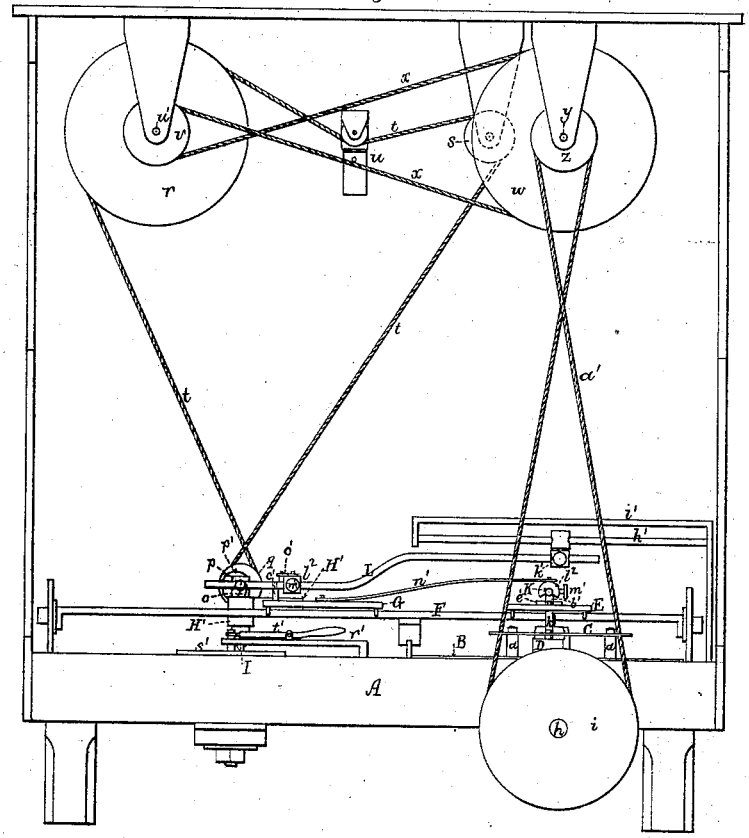
Fig. 2.
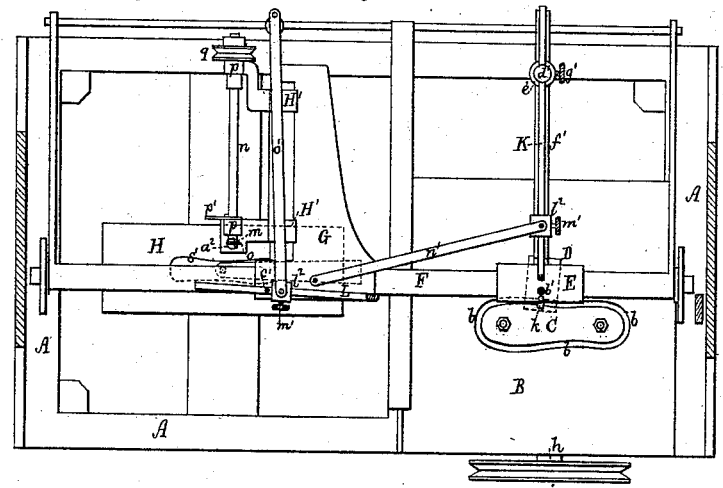
Witnesses
S. N. Piper
W. W. Lank
Inventor
James J. Breach
by attorney
R. M. Eddy

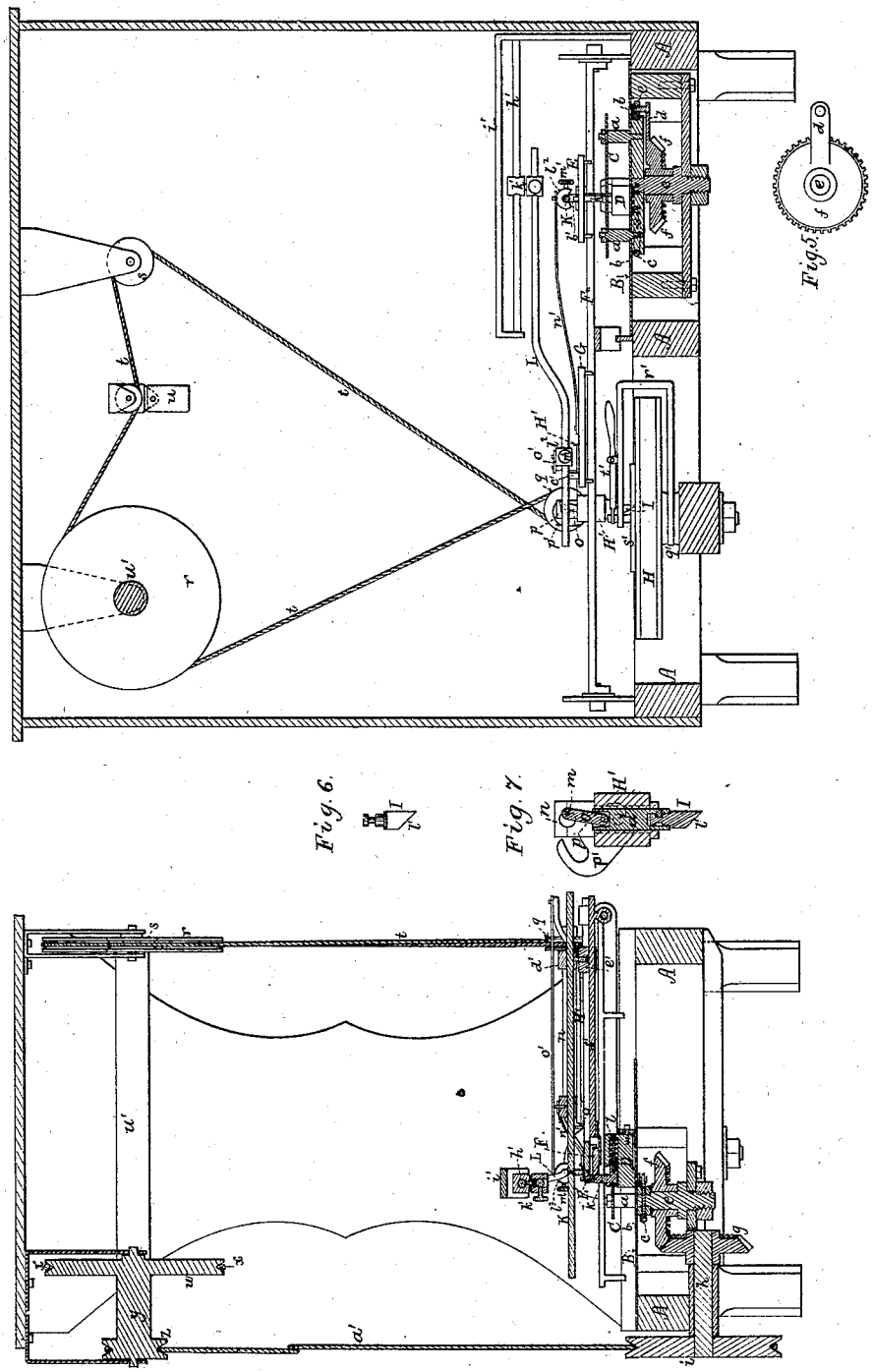

UNITED STATES PATENT OFFICE.

JAMES J. BREACH, OF SOUTH WEYMOUTH, MASSACHUSETTS.

IMPROVEMENT IN APPARATUS FOR GRADING PATTERNS.

Specification forming part of Letters Patent No. 219,615, dated September 16, 1879; application filed April 9, 1879.

*To all whom it may concern:*

Be it known that I, JAMES J. BREACH, of South Weymouth, of the county of Norfolk and State of Massachusetts, have invented a new and useful Machine for Grading Patterns; and do hereby declare the same to be described in the following specification and represented in the accompanying drawings, of which—

Figure 1 is a front elevation, and Fig. 2 a sectional top view, of it. Fig. 3 is a transverse section, and Fig. 4 is a longitudinal section, of it, taken through the pattern.

By means of the said machine a shoe sole or upper may be graded, or, in other words, be cut from or marked out on a sheet of leather or other suitable material, so as to be of a size varying from a pattern in length or width, or in both length and width, as occasion may require, such machine being automatic in character, and having to it the following elements or instrumentalities in combination, and to operate substantially as described and represented—that is to say, it has, first, a stationary pattern; second, a tracer and its carrier; third, mechanism for guiding the tracer-carrier around the pattern; fourth, mechanism for moving the tracer-carrier around the pattern; fifth, a table or platform for supporting the material to be cut or marked; sixth, a primary carriage adapted to move rectilinearly and transversely over both the work-platform and the pattern; seventh, two secondary slides or carriages, so adapted to the primary carriage as to be capable of sliding rectilinearly thereon in a direction longitudinally of it, one of such carriages being pivoted to the tracer, and the other carrying or having applied to it a marker or cutter carriage; eighth, the said marker or cutter carriage adapted to its supporting-carriage, so as to be capable of moving or sliding thereon or therein in directions transversely of the primary carriage; ninth, mechanism, substantially as described, applied to the aforesaid carriages for imparting to that of the marker or cutter, from the movements of the tracer-carriage, the necessary movements of such marker or cutter carriage to cause the marker or cutter to mark or cut a figure or copy, either corresponding in size or shape with the pattern, or varying in length or width, or in both length and width, relatively thereto, as occasion may require; tenth, a cutter or marker—

To which combination I have not only added mechanism for imparting to the cutter vertical reciprocating movements, to cause it to cut into and through a sheet of material when on the work-platform, but other mechanism—viz., a clamp or presser and its operative lever, and a bent arm, the latter being pivoted to the work-platform, so as to be capable of traveling around with the cutter or marker, and not interfere with the working thereof.

In the drawings, A denotes the frame of the machine, having within it a stationary horizontal plate, B, above which is the pattern C, such pattern being supported by two vertical posts, $a\ a$. The plate has an endless guide-slot, $b$, made in it parallel to the edge of the pattern. This groove receives one or more guides projecting down from the tracer-carriage D, there being fixed thereto a line or cord, $c$, also fastened to the end of an arm, $d$, projecting from a vertical shaft, $e$. On such shaft is a bevel-gear, $f$, that engages with another such gear, $g$, fixed on a driving-shaft, $h$, provided with a grooved pulley, $i$.

Fig. 5 is a top view of the arm and shaft and its gear, as described. On revolving the driving-shaft the tracer-carriage will be caused to move entirely around the pattern.

The tracer $k$, carried by the carriage D, is forced up to the edge of the pattern by a spring, $l$, suitably applied; and said tracer, at top, is pivoted to the smaller of the two secondary carriages E and G, which are supported on the primary carriage F. The said primary carriage F, duly sustained so as to move horizontally or rectilinearly over and transversely relatively to the pattern C and the work-support platform H, arranged as represented, supports the two carriages E and G, which should be so adapted to such primary carriage as to be capable of sliding upon it, lengthwise of it.

There is applied to the carriage G another carriage, H′, termed the "marker" or "cutter" carriage, as in some instances it may carry a pencil, stylus, or marker, to mark the outline of the figure to be produced. In the place, however, of such marker, I employ a vertical cutter, I, shaped as shown in Fig. 6, whose inclined edge $l^1$ is its cutting-edge. This cutter I so apply to a vertical carrier, $a^2$, as to enable it (the cutter) to freely swivel or revolve under such, in order that the cutter may readily adapt itself to its direction of movement on the sheet to be cut by it. The marker-carriage is to be applied so as to move rectilinearly within the carriage G, and in directions at right angles to the path of movement of such carriage G.

Furthermore, the cutter-carrier $a^2$ has pivoted to it and to a crank, $m$, of a horizontal shaft, $n$, a connecting-rod, $o$, the same being shown particularly in Fig. 7, which is a section of the cutter, its carrier, and the said connecting-rod and crank. The shaft $n$ is supported in bearings $p\ p'$, projecting from the cutter-carriage, and has fixed to it at its rear end a grooved wheel, $q$, about which and two other such wheels, $r\ s$, arranged as shown, a crossed endless band, $t$, works, such band being provided with a band-tightener, $u$, if necessary. The wheel $r$ is fixed on a shaft, $u'$, which carries a grooved wheel, $v$, about which and another such wheel, $w$, a second crossed band, $x$, is arranged, as shown. The wheel $w$ is fixed on an intermediate shaft, $y$, upon which is another wheel, $z$, about which and the driving-pulley $i$ a third crossed band, $a^1$, is disposed, all being arranged as represented. On revolving the driving-pulley rotary motion will be imparted to the shaft $n$, whereby reciprocating vertical movements will be given to the cutter.

There is pivoted to the carriage E one of two radius-rods, K L, the other of them—viz., that marked L—being suitably pivoted to the carriage G, their pivotal points being shown at $b'\ c'$. The radius-rod K extends through and slides in the head of a pivot, $d'$, which turns horizontally in an adjustable slide, $e'$, adapted to slide upon a cross-bar, $f'$, and provided with a screw, $g'$, to clamp it to the bar. Such bar $f'$ extends across and is fastened to the primary carriage. The other radius-rod, L, is also similarly applied to a stationary bar or rod, $h'$, arranged as shown, and supported by a stationary arm, $i'$, the adjustable pivotal connection being shown at $k'$.

Upon each of the rods $f'\ h'$ there is a slide, $l^2$, which is provided with a clamp-screw, $m'$. One of these slides is connected with the carriage G by a bar, $n'$, pivoted to the slide and carriage. The other slide, $l^2$, is connected with the cutter-carriage by another bar, $o'$, pivoted to the slide and to a curved arm extending up from the carriage. (See Fig. 8, which is a longitudinal section of the cutter-carriage, showing the said slide-arm and connection-bar.)

I would remark that the bearings of the operative shaft of the cutter may be, and are generally, so applied to the carriage as to be capable of being moved in a manner to admit of the cutter stock and shaft being raised, so as to draw the cutter upward out of the work as occasion may require, a rotary hook, $p'$, applied to the carriage, being used to hold down the shaft at other times.

Spanning the work-platform, and pivoted in the standard $q'$, upon which such platform is fixed, is a bent or U-shaped arm, $r'$, whose upper part supports a presser, $s'$, which is pivoted to the arm, and has applied to it and the arm a bent lever, $t'$, for raising and depressing it (the said presser) relatively to the work-support table. A wedge forced between the table and the outer arm of the lever may be, and is, usually employed to keep, by means of the lever, the presser down upon the work or sheet of material, in order to prevent it, while in the act of being cut by the knife, from revolving on and independently of the platform. The arm $r'$ can be revolved horizontally entirely around the table or platform, and will be so moved by the cutter-stock while it may be making its traverse around the presser.

By means of the two radius-rods K L, their support-bars $f'\ h'$ and stationary and adjustable pivots, and the connection-bars $n'\ o'$, combined with the stationary arm $i'$, the primary and secondary carriages, and cutter-carriage by devices as set forth, the machine may be adapted to automatically mark or cut a copy of the pattern, varied in length or width, or in both length and width, relatively to the pattern, as may be desirable.

My machine, though in some particulars like that described in the United States Patent No. 201,111, differs in others materially therefrom, my said machine having mechanism for operating it automatically, especially the tracer of it, relatively to the pattern, the tracer of the patented machine having no such mechanism, but being movable by hand about the pattern. Furthermore, I have a cutter and mechanism for reciprocating it vertically, such not being in the patented machine. So, in my machine, both the radius-bars are connected with their stationary bars by adjustable fulcra.

I therefore claim as my invention as follows, viz:

1. An automatic pattern-grading machine having the following elements or instrumentalities in combination, and to operate substantially as set forth—that is to say, first, a stationary pattern, C; second, a tracer, $k$, and its carrier D; third, mechanism (viz., the plate B, provided with the slot $b$) for guiding the carrier around the pattern; fourth, mechanism for moving the tracer-carriage around the pattern, such consisting in the line or cord $c$, arm $d$, shaft $e$, gears $f g$, shaft $h$, and pulley $i$; fifth, a table or platform, H, for supporting the sheet of material to be marked or cut; sixth, a primary carriage, F, adapted to move rectilinearly and transversely over both the work-platform H and the pattern C; seventh, two secondary slides or carriages, E and G, so adapted to the primary carriage as to slide rectilinearly thereon in a direction longitudinally of it, one of such carriages—viz., E—being pivoted to the tracer, and the other carrying or having applied to it the marker or cutter carriage; eighth, a marker or cutter carriage, H', adapted to its supporting-carriage G, so as to move or slide in directions transversely of the primary carriage F; ninth, a cutter, I, or a marker supported by the said carriage G, or by suitable devices applied thereto for such purpose; tenth, mechanism, substantially as described, applied to the aforesaid carriages E F G H', for imparting to the marker or cutter carriage H', by the movements of the tracer-carriage F, the necessary movements to cause the marker or cutter to mark or cut a figure or copy, either corresponding in size or shape with the pattern, or varying in either length or width, or in both, relatively thereto, as occasion may require, such mechanism consisting of the bars $f'$ $h'$, radius-rods K L, connection-bars $n'$ $o'$, and their stationary and adjustable pivotal connections, constructed, arranged, and applied essentially as set forth.

2. The combination of the following elements or instrumentalities, applied and to operate substantially as set forth, viz: first, a stationary pattern, C; second, a tracer, $k$, and its carrier D; third, mechanism (viz., the plate B, provided with the slot $b$) for guiding the carrier around the pattern; fourth, mechanism for moving the tracer-carriage around the pattern, such consisting in the line or cord $c$, arm $d$, shaft $e$, gears $f$ $g$, shaft $h$, and pulley $i$; fifth, a table or platform, H, for supporting the sheet of material to be marked or cut; sixth, a primary carriage, F, adapted to move rectilinearly and transversely over both the work-platform H and the pattern C; seventh, two secondary slides or carriages, E and G, so adapted to the primary carriage as to slide rectilinearly thereon in a direction longitudinally of it, one of which carriages—viz., E—being pivoted to the tracer, and the other carrying or having applied to it the marker or cutter carriage; eighth, a marker or cutter carriage, H', adapted to its supporting-carriage G, so as to move or slide in directions transversely of the primary carriage F; ninth, a cutter, I, or a marker supported by the said carriage G, or by suitable devices applied thereto for such purpose; tenth, mechanism for imparting to the cutter vertical reciprocating movements, to cause it to cut into and through the work, such mechanism, as described, consisting of the carrier $a^2$, connecting-rod $o$, crank $m$, shafts $n$, $w'$, and $y$, grooved wheels $g$, $r$, $s$, $v$, $w$, and $z$, and the bands $t$, $i$, and $a^1$, all arranged as set forth; eleventh, mechanism, substantially as described, applied to the aforesaid carriages E F G H', for imparting to the marker or cutter carriage H', by the movements of the tracer-carriage F, the necessary movements to cause the marker or cutter to mark or cut a figure or copy, either corresponding in size or shape with the pattern, or varying in either length or width, or in both, relatively thereto, as occasion may require, such mechanism consisting of the bars $f'$ $h'$, radius-rods K L, connection-bars $n'$ $o'$, and their stationary and adjustable pivotal connections, constructed, arranged, and applied essentially as set forth.

3. The combination of the bars $f'$ $h'$, radius-rods K L, connection-bars $n'$ $o'$, and their stationary and adjustable pivotal connections, substantially as set forth, such being applied to the stationary arm and to the primary, secondary, and marker carriages, and to operate therewith, as specified.

4. The combination of the bowed or bent arm $r'$ with the work-support platform and its sustaining-post $q'$, and the presser $s'$ and its operative lever $t'$, all being substantially and to operate as set forth.

JAMES J. BREACH.

Witnesses:
R. H. EDDY,
W. W. LUNT.